United States Patent
Wang

(10) Patent No.: US 11,861,381 B2
(45) Date of Patent: Jan. 2, 2024

(54) ICON UPDATING METHOD AND APPARATUS, AND ELECTRONIC DEVICE

(71) Applicant: BEIJING BYTEDANCE NETWORK TECHNOLOGY CO., LTD., Beijing (CN)

(72) Inventor: Yuechen Wang, Beijing (CN)

(73) Assignee: DOUYIN VISION CO., LTD., Beijing (CN)

( * ) Notice: Subject to any disclaimer, the term of this patent is extended or adjusted under 35 U.S.C. 154(b) by 0 days.

(21) Appl. No.: 17/886,790

(22) Filed: Aug. 12, 2022

(65) Prior Publication Data

US 2022/0391229 A1 Dec. 8, 2022

Related U.S. Application Data

(63) Continuation of application No. PCT/CN2021/082737, filed on Mar. 24, 2021.

(30) Foreign Application Priority Data

Apr. 1, 2020 (CN) .......................... 202010252303.8

(51) Int. Cl.
*G06F 9/451* (2018.01)
*G06F 3/04817* (2022.01)
(Continued)

(52) U.S. Cl.
CPC ............ *G06F 9/451* (2018.02); *G06F 3/0483* (2013.01); *G06F 3/04817* (2013.01); *G06F 16/9577* (2019.01); *G06T 11/00* (2013.01)

(58) Field of Classification Search
None
See application file for complete search history.

(56) References Cited

U.S. PATENT DOCUMENTS 7,143,065 B1 * 11/2006 Enright .............. G06Q 20/1085
705/43
11,303,600 B1 * 4/2022 Warner ................... H04L 51/52
(Continued)

FOREIGN PATENT DOCUMENTS

CN 101808152 A 8/2010
CN 103139050 A 6/2013
(Continued)

OTHER PUBLICATIONS

International Patent Application No. PCT/CN2021/082737; Int'l Search Report; dated Jun. 25, 2021; 3 pages.

*Primary Examiner* — Ryan Barrett
(74) *Attorney, Agent, or Firm* — BakerHostetler

(57) ABSTRACT

Disclosed in the embodiments of the present disclosure are an icon updating method and apparatus, and an electronic device. A specific implementation of the method comprises: determining whether a user needs to be prompted to open a preset subpage, wherein the preset subpage has an initial page icon; in response to determining that the user needs to be prompted to open the preset subpage, acquiring a reference image for updating the initial page icon; on the basis of the reference image, generating a first page icon; and updating the initial page icon to the first page icon. In the implementation, by means of updating the initial page icon of the preset subpage to the generated first page icon, the user is prompted to open the preset subpage.

15 Claims, 3 Drawing Sheets

(51) Int. Cl.
    *G06F 3/0483*      (2013.01)
    *G06F 16/957*      (2019.01)
    *G06T 11/00*      (2006.01)

(56) References Cited

U.S. PATENT DOCUMENTS

| | | | | |
|---|---|---|---|---|
| 2010/0146054 A1* | 6/2010 | Armstrong | ............ | G06F 3/0482 709/205 |
| 2012/0009896 A1* | 1/2012 | Bandyopadhyay | ... | G06F 1/1686 715/764 |
| 2012/0084707 A1* | 4/2012 | Abdel-Kader | .... | H04M 1/72403 715/779 |
| 2012/0324003 A1* | 12/2012 | Armstrong | ........... | G06Q 10/107 709/204 |
| 2013/0205226 A1* | 8/2013 | Mandre | ................. | H04L 51/046 715/752 |
| 2014/0258845 A1* | 9/2014 | Bourke | ................. | G06F 40/143 715/234 |
| 2015/0007061 A1* | 1/2015 | Mandre | ................. | H04L 51/046 715/753 |
| 2015/0019990 A1* | 1/2015 | Peterson | ................. | H04W 4/12 715/745 |
| 2015/0052462 A1* | 2/2015 | Kulkarni | ............. | G06F 3/04817 715/765 |
| 2015/0370456 A1* | 12/2015 | Kobayashi | ............ | G06F 3/0489 463/32 |
| 2017/0046024 A1* | 2/2017 | Dascola | ............. | G06F 3/04883 |
| 2017/0115876 A1* | 4/2017 | Lee | ...................... | G06F 3/04883 |
| 2017/0339263 A1* | 11/2017 | Jia | .......................... | H04M 1/724 |
| 2018/0052570 A1* | 2/2018 | Clediere | ............. | G06F 3/04817 |
| 2018/0095606 A1 | 4/2018 | Chae et al. | | |
| 2019/0147026 A1* | 5/2019 | Jon | ..................... | G06F 3/04845 715/230 |
| 2020/0012423 A1* | 1/2020 | Cinek | ................. | G06F 3/04817 |
| 2020/0019291 A1* | 1/2020 | Huang | ................. | G06F 3/04817 |
| 2021/0406221 A1* | 12/2021 | Meling | ................. | G06F 16/144 |

FOREIGN PATENT DOCUMENTS

| | | |
|---|---|---|
| CN | 105142129 A | 12/2015 |
| CN | 105373387 A | 3/2016 |
| CN | 105912195 A | 8/2016 |
| CN | 106095405 A | 11/2016 |
| CN | 107066258 A | 8/2017 |
| CN | 107220073 A | 9/2017 |
| CN | 108021377 A | 5/2018 |
| CN | 109359209 A | 2/2019 |
| CN | 109885318 A | 6/2019 |
| CN | 111459364 A | 7/2020 |

\* cited by examiner

ICON UPDATING METHOD AND APPARATUS, AND ELECTRONIC DEVICE

The present application is a continuation of International Patent Application No. PCT/CN2021/082737 filed on Mar. 24, 2021, which claims the priority to Chinese Patent Application No. 202010252303.8, titled "ICON UPDATING METHOD AND APPARATUS, AND ELECTRONIC DEVICE", filed on Apr. 1, 2020, with the Chinese Patent Office, both of which are incorporated herein by reference in their entireties.

FIELD

The present disclosure relates to the technical field of computers, and in particular to an icon updating method, an icon updating apparatus, and an electronic device.

BACKGROUND

In some applications, a displayed page may contain multiple sub-pages. Different sub-pages may contain different information. After a user opens a sub-page, information contained in the opened sub-page may be displayed to the user.

In some scenarios, an icon of a sub-page may be displayed in different colors before the user opens the sub-page and after the user opens the sub-page. For example, a page icon of a sub-page may be displayed in white before the user opens the sub-page, and the page icon of the sub-page may be displayed in green after the user opens the sub-page.

SUMMARY

The content part of the present disclosure is provided to introduce concepts in a brief form, and these concepts are to be described in detail in the following embodiments. The content of the present disclosure is not intended to identify the key features or essential features of the claimed technical solutions, nor is it intended to be used to limit the scope of the claimed technical solutions.

According to the embodiments of the present disclosure, an icon updating method, an icon updating apparatus, and an electronic device are provided, to prompt the user to open a preset sub-page by replacing an initial page icon of the preset sub-page with a generated first page icon.

In a first aspect, an icon updating method is provided according to some embodiments of the present disclosure. The method includes: determining whether to prompt a user to open a preset sub-page, where the preset sub-page has an initial page icon; in response to determining to prompt the user to open the preset sub-page, obtaining a reference image for replacing the initial page icon; generating a first page icon based on the reference image; and replacing the initial page icon with the first page icon.

In a second aspect, an icon updating apparatus is provided according to some embodiments of the present disclosure. The apparatus includes: a determination unit, an obtaining unit, a first generation unit, and a first updating unit. The determination unit is configured to determine whether to prompt a user to open a preset sub-page, where the preset sub-page has an initial page icon. The obtaining unit is configured to obtain a reference image for replacing the initial page icon in response to determining to prompt the user to open the preset sub-page. The first generation unit is configured to generate a first page icon based on the reference image. The first updating unit is configured to replace the initial page icon with the first page icon.

In a third aspect, an electronic device is provided according to some embodiments of the present disclosure. The electronic device includes one or more processors and a storage device. The storage device stores one or more programs. The one or more programs, when executed by the one or more processors, cause the one or more processors to perform the method provided in the first aspect.

In a fourth aspect, a computer-readable medium is provided according to some embodiments of the present disclosure. The computer-readable medium stores a computer program. The computer program, when executed by a processor, causes the processor to perform the method provided in the first aspect.

With the icon updating method, the icon updating apparatus, and the electronic device according to the embodiments of the present disclosure, it is determined whether to prompt a user to open a preset sub-page, a reference image for replacing the initial page icon is obtained in response to determining to prompt the user to open the preset sub-page, a first page icon is generated based on the reference image, and the initial page icon is replaced with the first page icon. Therefore, the user is prompted to open a preset sub-page by replacing an initial page icon of the preset sub-page with a generated first page icon.

BRIEF DESCRIPTION OF THE DRAWINGS

The above and other features, advantages and aspects of the embodiments of the present disclosure will be more apparent in conjunction with the accompanying drawings and with reference to the following embodiments. Throughout the drawings, the same or similar reference numerals represent the same or similar elements. It should be understood that the drawings are schematic and the originals and elements are unnecessarily drawn to scale.

DETAILED DESCRIPTION OF THE EMBODIMENTS

The embodiments of the present disclosure are described in detail below with reference to the accompanying drawings. Although the drawings show some embodiments of the present disclosure, it should be understood that the present disclosure can be implemented in various forms and is not limited to the embodiments. The embodiments are provided for a more thorough and complete understanding of the present disclosure. It should be understood that the drawings and the embodiments in the present disclosure are only illustrative of the disclosure, and are not intended to limit the protection scope of the present disclosure.

It should be understood that the steps of the method according to the embodiments of the present disclosure may be performed in different orders, and/or be performed in parallel. In addition, the method embodiments may include additional steps and/or omit to perform the illustrated steps, not limiting the scope of the present disclosure.

The term "including" and its variants as used herein are open-ended includes, that is, "including but not limited to". The term "based on" means "based at least in part on". The term "one embodiment" means "at least one embodiment". The term "another embodiment" means "at least one additional embodiment". The term "some embodiments" means "at least some embodiments". Definitions of other terms are provided in the following description.

It should be noted that concepts such as "first" and "second" mentioned in the present disclosure are only used to distinguish different devices, modules or units, and are not intended to limit the order of functions performed by the devices, modules or units or the interdependence of the devices, modules and units.

It should be noted that the modifications of "one" and "a plurality of" mentioned in the present disclosure are illustrative rather than restrictive, and those skilled in the art should understand that unless the context clearly indicates otherwise, "one" and "a plurality of" should be understood as "one or a plurality of".

Names of messages or information interacted between multiple apparatuses in the embodiments of the present disclosure are illustrative rather than limit the scope of the messages or information.

Figure 1:
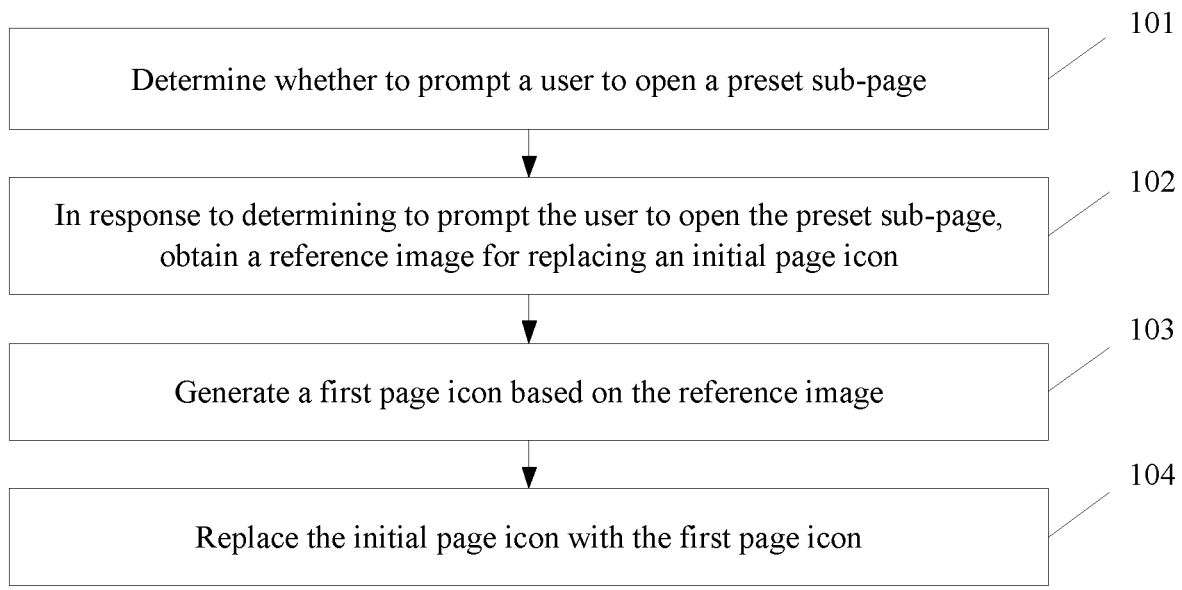
FIG. 1 is a flow chart of an icon updating method according to some embodiments of the present disclosure.

Reference is made to FIG. 1, which shows a flow chart of an icon updating method according to some embodiments of the present disclosure. As shown in FIG. 1, the icon updating method includes the following steps 101 to 104.

In step 101, it is determined whether to prompt a user to open a preset sub-page.

Figure 5:
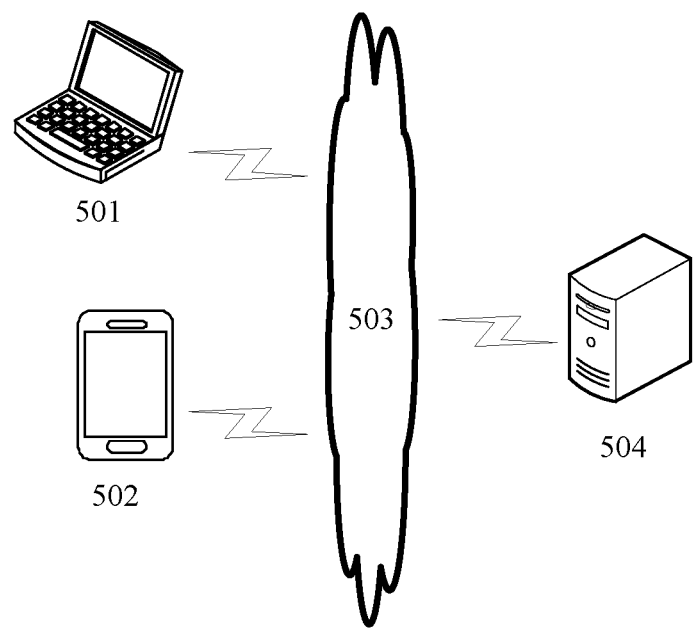
FIG. 5 an exemplary system architecture to which an icon updating method according to some embodiments of the present disclosure may be applied.

In some embodiments, the execution body (such as, the terminal device 501 and the terminal device 502 shown in FIG. 5) of the icon updating method may determine whether to prompt a user to open a preset sub-page.

A page displayed in an application may contain multiple sub-pages. The preset sub-page may be a sub-page preset from the multiple sub-pages contained in the page.

The preset sub-page has an initial page icon. The initial page icon may be a page icon that the preset sub-page has before the page icon is updated.

In some scenarios, the execution subject may determine a time length since the user last opened the preset sub-page. In a case that the time length since the user last opened the preset sub-page is greater than or equal to a preset time length, the execution body may determine to prompt the user to open the preset sub-page. In a case that the time length since the user last opened the preset sub-page is less than a preset time length, the execution body may determine not to prompt the user to open the preset sub-page.

In step 102, in response to determining to prompt the user to open the preset sub-page, a reference image for replacing the initial page icon is obtained.

In some embodiments, in response to determining to prompt the user to open the preset sub-page, the execution body may obtain a reference image for replacing the initial page icon.

The reference image may be used for replacing the initial page icon.

In some scenarios, the execution subject may obtain the reference image for replacing the initial page icon from a local server or a communicatively connected server (such as, the server 504 shown in FIG. 5).

In step 103, a first page icon is generated based on the reference image.

In some embodiments, after obtaining the reference image, the execution body may generate a first page icon.

The first page icon may be used for replacing the initial page icon.

In some scenarios, the execution body may compress the reference image to obtain a thumbnail, and then to generate the first page icon. That is, the first page icon may be a thumbnail of the reference image.

In step 104, the initial page icon is replaced with the first page icon.

In some embodiments, after generating the first page icon, the execution body may replace the initial page icon of the preset sub-page with the first page icon.

Figure 2:
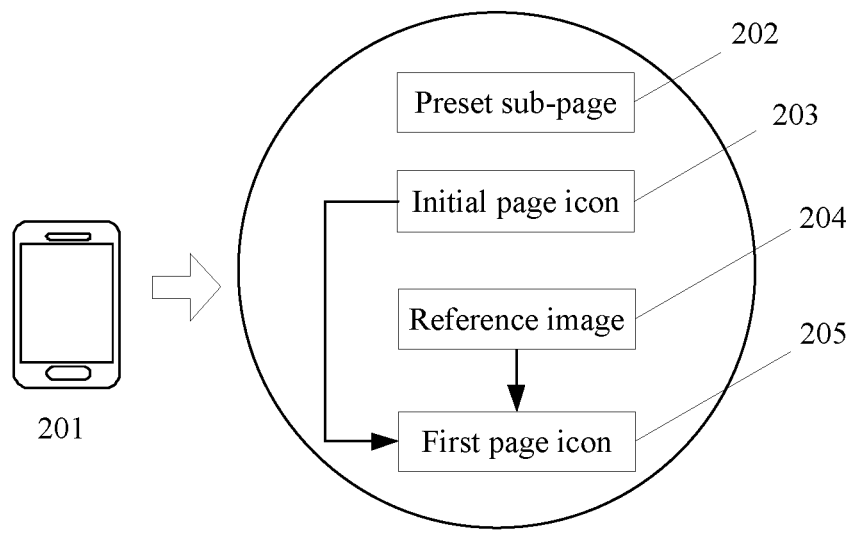
FIG. 2 is a schematic diagram of an application scenario of an icon updating method according to some embodiments of the present disclosure.

Reference is made to FIG. 2, which shows a schematic diagram of an application scenario of an icon updating method according to some embodiments of the present disclosure. As shown in FIG. 2, a terminal device 201 may determine whether to prompt the user to open a preset sub-page 202. In response to determining to prompt the user to open the preset sub-page 202, the terminal device 201 may obtain a reference image 204 for replacing an initial page icon 203 of the preset sub-page 202. The terminal device 201 may generate a first page icon 205 based on the reference image 204. Finally, the terminal device 201 may replace the initial page icon 203 with the first page icon 205.

At present, with regard to prompting the user to open a sub-page, a prompt sign is displayed near a page icon of a sub-page to prompt the user to open the sub-page in a case that the sub-page contains information to be viewed by the user according to the conventional technology. It should be understood that in a case that the displayed prompt sign is small in size, the user tends to ignore the prompt sign, resulting in a poor effect of prompting the user to open the sub-page.

In the embodiments, in response to determining to prompt the user to open the preset sub-page, the reference image for replacing the initial page icon of the preset sub-page is obtained. Based on the obtained reference image, the first page icon is generated. Then, the initial page icon of the preset sub-page is replaced with the generated first page icon. Therefore, the user is prompted to open the preset sub-page by replacing the initial page icon of the preset sub-page with the generated first page icon. It should be understood that, it is easy to cause the user to notice the change of the page icon of the preset sub-page by replacing the initial page icon of the preset sub-page, thereby improving the effect of prompting the user to open the preset sub-page.

In some optional implementations, the execution body may perform the following steps.

Specifically, in response to a time length, in which an operation of opening the preset sub-page is not detected after replacing the initial page icon, not less than a second preset time length, the first page icon is replaced with the initial page icon.

In the implementations, the execution body may detect an operation of opening the preset sub-page performed by the user through a preset detection program.

In the implementations, in response to a time length, in which an operation of opening the preset sub-page is not detected after replacing the initial page icon, not less than a second preset time length, the execution body may replace the first page icon with the initial page icon.

Therefore, after the initial page icon of the preset sub-page is replaced with the first page icon, it is stopped to prompt the user to open the preset sub-page if the user does not open the preset sub-page for a long time period.

In some optional implementations, the execution body may generate the first page icon in the following manner.

Specifically, a page icon matching a style of the initial page icon is generated as the first page icon.

The style of the initial page icon may include, but is not limited to, at least one of: a size of the initial page icon, a shape of the initial page icon, and a pixel value of the initial page icon.

The page icon matching the style of the initial page icon indicates that a difference between the page icon and the initial page icon in style is within a preset difference range.

In some scenarios, the execution body may adjust the size, the shape, the pixel value and the like of the initial page icon, and generate a page icon within the preset difference range from the initial page icon in size, shape, pixel value and the like, as the first page icon.

Figure 3:
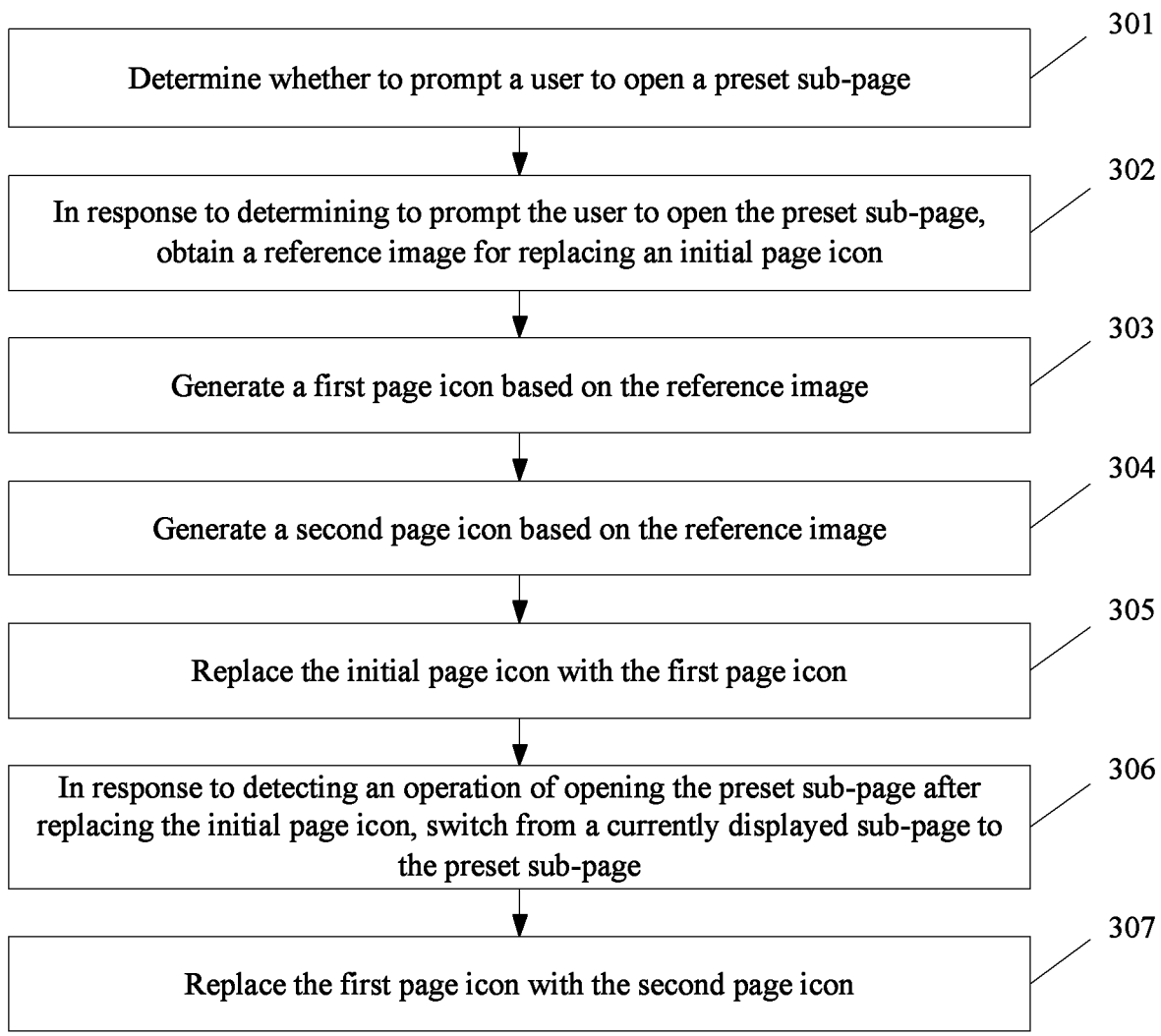
FIG. 3 is a flow chart of an icon updating method according to some embodiments of the present disclosure.

Reference is made to FIG. 3, which shows a flow chart of an icon updating method according to some embodiments of the present disclosure. As shown in FIG. 3, the icon updating method includes the following steps 301 to 307.

In step S301, it is determined whether to prompt a user to open a preset sub-page.

In step 302, in response to determining to prompt the user to open the preset sub-page, a reference image for replacing the initial page icon is obtained.

In step 303, a first page icon is generated based on the reference image.

The steps 301, 302, and 303 may be respectively performed similar to the steps 101, 102, and 103 in the embodiments shown in FIG. 1. The descriptions of the steps 101, 102 and 103 are applicable to the steps 301, 302 and 303, which are not repeated herein.

In step 304, a second page icon is generated based on the reference image.

In some embodiments, after obtaining the reference image for replacing the initial page icon, the execution subject (such as, the terminal device 501 and the terminal device 502 shown in FIG. 5) of the icon updating method may generate a second page icon based on the obtained reference image.

The second page icon may be used for replacing the initial page icon. The second page icon is different from the first page icon.

In some scenarios, the second page icon is different from the first page icon in size. The execution body may compress the reference image to obtain a thumbnail having a size different from the first page icon, and then to generate the second page icon.

In some scenarios, the pixel value of the second page icon is different from the pixel value of the first page icon. The execution body may compress the reference image into a thumbnail having a same size as the first page icon, and adjust the pixel value of the obtained thumbnail to a preset pixel value, thereby generating the second page icon.

It should be noted that, the execution subject may perform step 303 and step 304 in parallel, or may perform step 303 and step 304 respectively, which is not limited herein.

In step 305, the initial page icon is replaced with the first page icon.

The step 305 may be respectively performed similar to the step 104 in the embodiments shown in FIG. 1. The descriptions of the step 104 are applicable to the step 305, which are not repeated herein.

In step 306, in response to detecting an operation of opening the preset sub-page after replacing the initial page icon, a currently displayed sub-page is switched to the preset sub-page.

In some embodiments, the execution body may detect the operation of opening the preset sub-page performed by the user through a preset detection program.

In practice, the operation performed by the user for opening the preset sub-page may be various operations performed by the user, for example, an operation of sliding from the currently displayed page to the preset sub-page, and an operation, such as a single click, a double click and a long press, performed by the user on a page icon of the preset sub-page.

In some embodiments, in response to detecting an operation of opening the preset sub-page after replacing the initial page icon, the execution subject may switch from a currently displayed sub-page to the preset sub-page.

In step 307, the first page icon is replaced with the second page icon.

In some embodiments, the execution subject may replace the first page icon with the second page icon.

In some scenarios, on detecting the operation of opening the preset sub-page performed by the user, the execution body may replace the first page icon with the second page icon. In other scenarios, when switching from the currently displayed sub-page to the preset sub-page, the execution body may replace the first page icon with the second page icon.

In some optional implementations, the execution body may perform the following steps.

Specifically, in response to a time length, in which the first page icon is replaced with the second page icon, not less than a first preset time length, the second page icon is replaced with the initial page icon.

It should be understood that, in a case that the time length, in which the first page icon is replaced with the second page icon, is not less than the first preset time length, it indicates that the user opens the preset sub-page for a long time period. Thus, after the user is successfully prompted to open the preset subpage, it is stopped to prompt the user to open the preset subpage.

In some embodiments, in response to detecting the operation of opening the preset sub-page, the currently displayed sub-page is switched to the preset sub-page, and the first page icon is replaced with the second page icon. Therefore, by replacing the first page icon of the preset sub-page with the second page icon, the user is prompted that the preset sub-page has been switched to.

In some optional implementations of an icon updating method according to the embodiments of the present disclosure, the execution body may perform the following operations to determine whether to prompt the user to open the preset sub-page.

In a first step, in response to detecting an operation of following a target user performed by the user, a request for following the target user is transmitted to a communicatively connected server.

The target user may be a user whom the user requests to follow.

The operation of following a target user may be an operation of the user requesting to follow a target user. In some scenarios, the operation of following a target user may be an operation performed by the user on a control prompting following a target user.

In a second step, in response to following result information returned by the server indicating that the user has successfully followed the target user, it is determined to prompt the user to open the preset sub-page.

The following result information may indicate a result of the user requesting to follow the target user.

After the user successfully follows the target user, it is determined to prompt the user to open the preset sub-page.

In some optional implementations of an icon updating method according to the embodiments of the present disclosure, the execution subject may obtain an avatar of the target user as the reference image. Therefore, after the user successfully follows the target user, the avatar of the target user is used as the reference image for generating the first page icon.

In some optional implementations of an icon updating method according to the embodiments of the present disclosure, information published by the target user followed by the user is displayed in the preset sub-page.

Information published by a user may include, but is not limited to, at least one of: a text, an image, a video, and an audio.

It should be understood that after the user successfully follows the target user, the user is further prompted to view the information published by the followed target user by prompting the user to open the preset sub-page.

Figure 4:
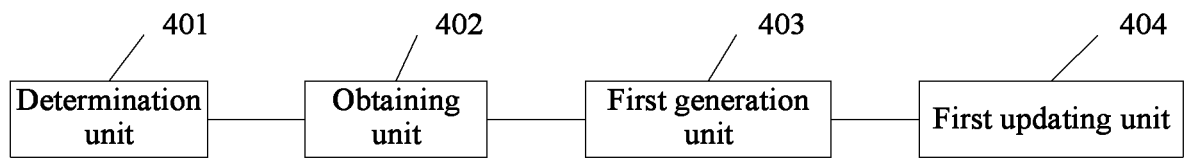
FIG. 4 is a schematic structural diagram of an icon updating apparatus according to some embodiments of the present disclosure.

Referring to FIG. 4, as an implementation of the method shown in the above Figures, an icon updating apparatus is provided according to some embodiments of the present disclosure. The apparatus embodiments correspond to the above method embodiments shown in FIG. 1. Specifically, the apparatus may be applied to various electronic devices.

As shown in FIG. 4, the icon updating apparatus according to some embodiments of the present disclosure includes: a determination unit 401, an obtaining unit 402, a first generation unit 403, and a first updating unit 404. The determination unit 401 is configured to determine whether to prompt a user to open a preset sub-page, where the preset sub-page has an initial page icon. The obtaining unit 402 is configured to obtain a reference image for replacing the initial page icon in response to determining to prompt the user to open the preset sub-page. The first generation unit 403 is configured to generate a first page icon based on the reference image. The first updating unit 404 is configured to replace the initial page icon with the first page icon.

In some embodiments, the processing of the determination unit 401, the obtaining unit 402, the first generation unit 403, and the first updating unit 404 of the icon updating apparatus and the technical effects obtained by performing the processing may refer to the descriptions of the steps 101 to 104 in the embodiments corresponding to FIG. 1, and are not repeated herein.

In some optional implementations, the icon updating apparatus may further include: a second generation unit (not shown in the Figures) and a second updating unit (not shown in the Figures). The second generation unit is configured to generate a second page icon based on the reference image. The second updating unit is configured to, in response to detecting an operation of opening the preset sub-page after replacing the initial page icon, switch from a currently displayed sub-page to the preset sub-page; and replace the first page icon with the second page icon.

In some optional implementations, the icon updating apparatus may further include: a first restoring unit (not shown in the Figures). The first restoring unit is configured to, in response to a time length, in which the first page icon is replaced with the second page icon, not less than a first preset time length, replace the second page icon with the initial page icon.

In some optional implementations, the icon updating apparatus may further include: a second restoring unit (not shown in the Figures). The second restoring unit is configured to, in response to a time length, in which an operation of opening the preset sub-page is not detected after replacing the initial page icon, not less than a second preset time length, replace the first page icon with the initial page icon.

In some optional implementations, the first generation unit 403 is further configured to generate a page icon matching a style of the initial page icon as the first page icon.

In some optional implementations, the determination unit 401 is further configured to: in response to detecting an operation of following a target user performed by the user, transmit a request for following the target user to a communicatively connected server; and in response to following result information returned by the server indicating that the user has successfully followed the target user, determine to prompt the user to open the preset sub-page.

In some optional implementations, the obtaining unit 402 is further configured to: obtain an avatar of the target user as the reference image.

In some optional implementations, information published by the target user followed by the user is displayed in the preset sub-page.

Reference is made to FIG. 5, which shows an exemplary system architecture to which an icon updating method according to some embodiments of the present disclosure may be applied.

As shown in FIG. 5, the system architecture may include a terminal device 501, a terminal device 502, a network 503, and a server 504. The network 503 is configured to provide a medium of communication links between the terminal device 501, the terminal device 502 and the server 504. The network 503 may include various connections, such as wired connections, wireless communication link connections, fiber optic cable connections, or the like.

The terminal devices 501 and 502 may interact with the server 504 through the network 503. Various client applications may be installed on the terminal devices 501 and 502. For example, shopping applications, search applications, social networking applications and the like may be installed on the terminal devices 501 and 502. In some scenarios, in response to determining to prompt the user to open the preset sub-page, each of the terminal devices 501 and 502 may generate a first page icon. Further, each of the terminal devices 501 and 502 may replace the initial page icon of the preset sub-page with the generated first page icon.

The terminal devices 501 and 502 may be hardware or software. In a case that the terminal devices 501 and 502 are hardware, the terminal devices 501 and 502 may be various electronic devices having a display screen and supporting information interaction, including but not limited to smart phones, tablet computers, laptop computers, desktop computers, and the like. In a case that the terminal devices 501 and 502 are software, the terminal devices 501 and 502 may be installed in the electronic devices listed above, and may be implemented as multiple software or software modules, and may be implemented as a single software or software module. There is no specific limitation herein.

The server 504 may provide various services. In some scenarios, the server 504 may provide the terminal devices 501 and 502 with the reference image for replacing the initial page icon of the preset sub-page.

The server 504 may be hardware or software. In a case that the server 504 is hardware, the server 504 may be implemented as a distributed server cluster including multiple servers, or may be implemented as a single server. In a case that the server 504 is software, the server 504 may be implemented as multiple software or software modules (such as, multiple software or software modules for providing distributed services), or may be implemented as a single software or software module. There is no limitation herein.

It should be noted that, the icon updating method according to the embodiments of the present disclosure may be performed by each of the terminal devices 501 and 502. Correspondingly, the icon updating apparatus may be arranged in each of the terminal devices 501 and 502.

It should be understood that the numbers of the terminal devices, the network and the server in FIG. 5 are only illustrative. There can be any number of terminal devices, networks and servers according to implementation requirements.

Hereinafter, reference is made to FIG. 6, which shows a schematic structural diagram of an electronic device (such as a terminal device shown in FIG. 5) suitable for implementing the embodiments of the present disclosure. The terminal devices according to the embodiments of the present disclosure may include, but are not limited to, mobile terminals, such as mobile phones, laptops, digital broadcast receivers, PDAs (personal digital assistants), PADs (tablet PCs), PMPs (portable multimedia players) and vehicle-mounted terminals (such as in-vehicle navigation terminals), and fixed terminals such as digital TVs and desktop computers. The electronic device shown in FIG. 6 is only exemplary, and should not indicate any limitation to the function and application scope of the embodiments of the present disclosure.

Figure 6:
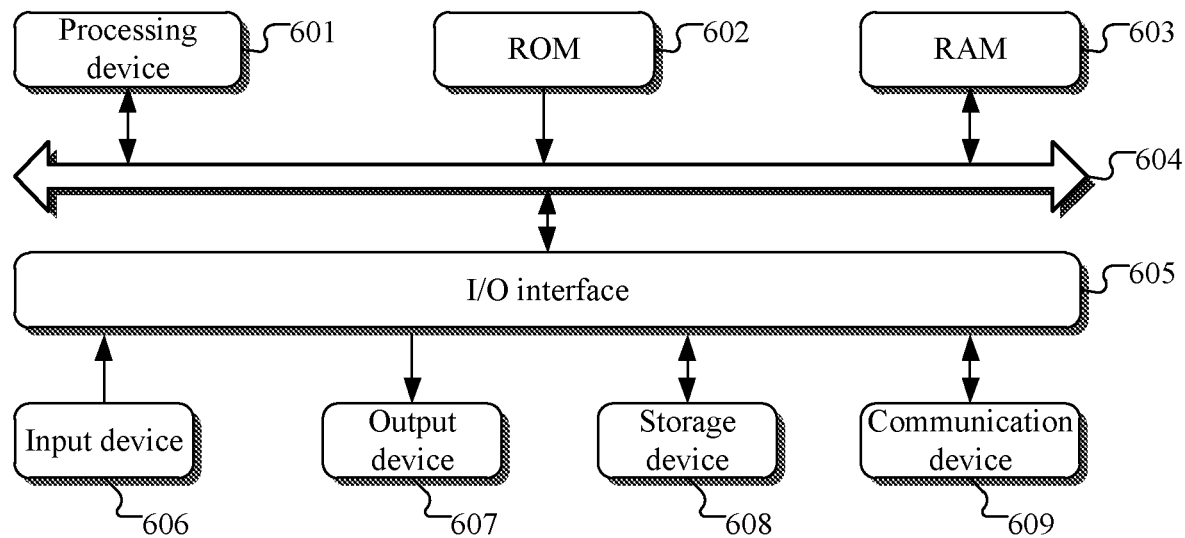
FIG. 6 is a schematic structural diagram of an electronic device according to some embodiments of the present disclosure.

As shown in FIG. 6, the electronic device may include a processing device 601 (such as a central processing unit and a graphics processor) which may execute various operations and processing through a program stored in a Read Only Memory (ROM) 602 or a program loaded from the storage device 608 into a Random Access Memory (RAM) 603. The RAM 603 is further configured to store various programs and data required by the electronic device. The processing device 601, the ROM 602 and the RAM 603 are connected to each other through a bus 604. An Input/output (I/O) interface 605 is also connected to the bus 604.

Generally, the I/O interface 605 may be connected to: an input device 606, such as a touch screen, a touch panel, a keyboard, a mouse, a camera, a microphone, an accelerometer, and a gyroscope; an output device 607, such as a liquid crystal display (LCD), a speaker, and a vibrator; a storage device 608, such as a magnetic tape and a hard disk; and a communication device 609. The communication device 609 enables the electronic device to perform wireless or wired communication with other devices for data exchanging. Although FIG. 6 shows an electronic device having various components, it should be understood that the illustrated components are not necessarily required to all be implemented or included. Alternatively, more or fewer components may be implemented or included. Each of the blocks shown in FIG. 6 may represent one device, or may represent multiple devices as required.

Particularly, according to some embodiments of the present disclosure, the process described above in conjunction with flow charts may be implemented as a computer program. For example, a computer program product is further provided according to some embodiments of the present disclosure, including a computer program carried on a non-transitory computer readable medium. The computer program includes program codes for performing the method shown in the flow charts. In the embodiments, the computer program may be downloaded and installed from the network via the communication device 609, or installed from the storage device 608, or installed from the ROM 602. When the computer program is executed by the processing device 601, the above-mentioned functions defined in the method according to the embodiments of the present disclosure are performed.

It should be noted that, the computer readable medium according to some embodiments of the present disclosure may be a computer readable signal medium or a computer readable storage medium or any combination thereof. The computer readable storage medium may be, but is not limited to, a system, an apparatus, or a device in an electronic, magnetic, optical, electromagnetic, infrared, or semi-conductive form, or any combination thereof. The computer readable storage medium may be, but is not limited to, an electrical connection with one or more wires, a portable computer disk, a hard disk, a random access memory (RAM), a read-only memory (ROM), an erasable programmable read-only memory (EPROM or flash memory), an optical fiber, a portable compact disc read-only memory (CD-ROM), a light storage device, a magnetic storage device or any combination thereof. In some embodiments of the present disclosure, the computer readable storage medium may be any tangible medium containing or storing a program, and the program may be used by or in combination with an instruction execution system, apparatus, or device. In some embodiments of the present disclosure, the computer readable signal medium may be a data signal transmitted in a baseband or transmitted as a part of a carrier wave and carrying computer readable program codes. The transmitted data signal may be in various forms, including but not limited to an electromagnetic signal, an optical signal or any proper combination thereof. The computer readable signal medium may be any computer readable medium other than the computer readable storage medium and can send, propagate or transmit programs to be used by or with an instruction execution system, apparatus or device. The program codes stored in the computer readable medium may be transmitted via any proper medium including but not limited to: wired, optical fiber cable, radio frequency (RF), or any suitable combination of the foregoing.

In some embodiments, the client and the server may perform communication using any currently known or future developed network protocol such as HTTP (HyperText Transfer Protocol), and may be interconnected with any form or medium of digital data communication (for example, a communication network). The communication network embodiments include local area networks ("LANs"), wide area networks ("WANs"), internet, end-to-end networks (for example, ad hoc end-to-end networks), and any networks currently known or developed in the future.

The computer readable medium may be incorporated in the electronic device, or may exist alone without being assembled into the electronic device. The computer readable medium carries one or more programs. The one or more programs, when being executed by the electronic device, cause the electronic device to: determine whether to prompt a user to open a preset sub-page, where the preset sub-page has an initial page icon; in response to determining to prompt the user to open the preset sub-page, obtain a reference image for replacing the initial page icon; generate a first page icon based on the reference image; and replace the initial page icon with the first page icon.

Computer program code for performing operations of the present disclosure may be written in one or more programming languages, or a combination of the foregoing, and the programming language includes, but is not limited to, object oriented programming languages, such as Java, Smalltalk, and C++, also includes conventional procedural programming languages, such as "C" language or similar programming languages. The program codes may be executed entirely on a user's computer, or be executed partly on the user's computer, or be executed as a stand-alone software package, or be executed partly on the user's computer and partly on a remote computer, or be executed entirely on the remote computer or server. In a case that the execution of the program code involves a remote computer, the remote computer may be connected to a user's computer via any kind of network, including a local area network (LAN) or a wide area network (WAN), or may be connected to an external computer (for example, via an Internet providing by an Internet service provider).

The flow charts and block diagrams in the Figures shows the architecture, functionality and operation of possible implementations of the products of system, method and computer program provided according to the embodiments of the present disclosure. Each block in the flow charts or block diagrams can represent a module, a program segment, or a part of code, and the module, the program segment, or the part of code includes one or more executable instructions for implementing specified logical functions. It should be noted that in some alternative implementations, the functions noted in the blocks may be implemented in a different order than those illustrated in the Figures. For example, two blocks shown in succession may in fact be executed substantially in parallel, and they may sometimes be executed in a reverse order, depending upon the functionality involved. It also should be noted that each block in the schematic diagrams and/or flow charts, and combinations of blocks in the schematic diagrams and/or flowcharts, can be implemented by a dedicated hardware-based system which is configured to implement specified functions or operations, or can be implemented by using a combination of dedicated hardware and computer instructions.

The units mentioned in the description of the embodiments of the present disclosure may be implemented by means of software, or otherwise by means of hardware. The designation of these units does not in any case constitute a qualification of the unit itself. For example, the determination unit may also be described as a unit "for determining whether to prompt a user to open a preset sub-page".

The functions described above in this application may be performed at least in part by one or more hardware logic components. For example, without limitation, exemplary types of hardware logic components that can be used include: Field Programmable Gate Array (FPGA), Application Specific Integrated Circuit (ASIC), Application Specific Standard Product (ASSP), System on Chip (SOC), Complex Programmable Logical device (CPLD) and so on.

In the present disclosure, a machine-readable medium may be a tangible medium, which may contain or store a program used by the instruction execution system, apparatus, or device or a program used in combination with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus or device, or any suitable combination of thereof. The machine-readable storage media, for example, includes an electrical connection based on one or more wires, a portable computer disk, a hard drive, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination of thereof.

The above description includes merely preferred embodiments of the present disclosure and explanations of technical principles used. Those skilled in the art should understand that the scope of the present disclosure is not limited to technical solutions formed by a specific combination of the above technical features, but covers other technical solutions formed by any combination of the above technical features or equivalent features thereof without departing from the concept of the present disclosure. For example, a technical solution formed by interchanging the above features with technical features having similar functions as disclosed (but not limited thereto) is also covered in the scope of the present disclosure.

The invention claimed is:

1. An icon updating method, comprising:
   determining whether to prompt a user to open a preset sub-page based on whether the user has successfully followed a target user, wherein the preset sub-page has an initial page icon, wherein the initial page icon is not associated with the target user, and wherein the preset sub-page is configured to display information published by the target user followed by the user;
   in response to determining to prompt the user to open the preset sub-page, obtaining a reference image, wherein the reference image is associated with the target user;
   generating a first page icon based on the reference image; and
   prompting the user to open the preset sub-page by replacing the initial page icon with the first page icon, wherein the method further comprises in response to determining that a time length, in which an operation of opening the preset sub-page is not detected after the prompting the user to open the preset sub-page, is greater than a preset time length, replacing the first page icon with the initial page icon.

2. The method according to claim 1, wherein after obtaining the reference image for replacing the initial page icon, the method further comprises:
   generating a second page icon based on the reference image; and
   the method further comprises:
   in response to detecting an operation of opening the preset sub-page after replacing the initial page icon, switching from a currently displayed sub-page to the preset sub-page; and
   replacing the first page icon with the second page icon.

3. The method according to claim 2, further comprising:
   in response to determining that a time length, in which the preset sub-page has been opened, is greater than a first preset time length, replacing the second page icon with the initial page icon.

4. The method according to claim 1, wherein the generating a first page icon comprises:
   generating a page icon matching a style of the initial page icon as the first page icon.

5. The method according to claim 1, wherein the determining whether to prompt a user to open a preset sub-page comprises:

in response to detecting an operation of following a target user performed by the user, transmitting a request for following the target user to a communicatively connected server; and in response to following result information returned by the server indicating that the user has successfully followed the target user, determining to prompt the user to open the preset sub-page.

6. The method according to claim 5, wherein the obtaining a reference image for replacing the initial page icon comprises:

obtaining an avatar of the target user as the reference image.

7. The method according to claim 5, wherein information published by the target user followed by the user is displayed in the preset sub-page.

8. An icon updating apparatus, comprising:

one or more processors; and a storage device, storing one or more programs; wherein the one or more programs, when executed by the one or more processors, cause the one or more processors to perform operations comprising:

determining whether to prompt a user to open a preset sub-page based on whether the user has successfully followed a target user, wherein the preset sub-page has an initial page icon, wherein the initial page icon is not associated with the target user, and wherein the preset sub-page is configured to display information published by the target user followed by the user;

obtaining a reference image in response to determining to prompt the user to open the preset sub-page, wherein the reference image is associated with the target user;

generating a first page icon based on the reference image; and prompting the user to open the preset sub-page by replacing the initial page icon with the first page icon, wherein the operations further comprise in response to determining that a time length, in which an operation of opening the preset sub-page is not detected after the prompting the user to open the preset sub-page, is greater than a preset time length, replacing the first page icon with the initial page icon.

9. The apparatus according to claim 8, wherein the one or more programs, when executed by the one or more processors, cause the one or more processors to perform an operation comprising:

generating a second page icon based on the reference image; and the one or more programs, when executed by the one or more processors, cause the one or more processors to perform operations comprising:

in response to detecting an operation of opening the preset sub-page after replacing the initial page icon, switching from a currently displayed sub-page to the preset sub-page; and replacing the first page icon with the second page icon.

10. The apparatus according to claim 9, wherein the one or more programs, when executed by the one or more processors, cause the one or more processors to perform an operation comprising:

in response to determining that a time length, in which the preset sub-page has been opened, is greater than a first preset time length, replacing the second page icon with the initial page icon.

11. The apparatus according to claim 8, wherein the one or more programs, when executed by the one or more processors, cause the one or more processors to perform an operation comprising:

generating a page icon matching a style of the initial page icon as the first page icon.

12. The apparatus according to claim 8, wherein the one or more programs, when executed by the one or more processors, cause the one or more processors to perform operations comprising:

in response to detecting an operation of following a target user performed by the user, transmitting a request for following the target user to a communicatively connected server; and in response to following result information returned by the server indicating that the user has successfully followed the target user, determining to prompt the user to open the preset sub-page.

13. The apparatus according to claim 12, wherein the one or more programs, when executed by the one or more processors, cause the one or more processors to perform an operation comprising:

obtaining an avatar of the target user as the reference image.

14. The apparatus according to claim 12, wherein information published by the target user followed by the user is displayed in the preset sub-page.

15. A non-transitory computer-readable medium storing a computer program, wherein the computer program, when executed by a processor, causes the processor to perform operations comprising:

determining whether to prompt a user to open a preset sub-page based on whether the user has successfully followed a target user, wherein the preset sub-page has an initial page icon, wherein the initial page icon is not associated with the target user, and wherein the preset sub-page is configured to display information published by the target user followed by the user;

in response to determining to prompt the user to open the preset sub-page, obtaining a reference image, wherein the reference image is associated with the target user;

generating a first page icon based on the reference image; and prompting the user to open the preset sub-page by replacing the initial page icon with the first page icon, wherein the operations further comprise in response to determining that a time length, in which an operation of opening the preset sub-page is not detected after the prompting the user to open the preset sub-page, is greater than a preset time length, replacing the first page icon with the initial page icon.

* * * * *